Feb. 14, 1956   R. M. GILL   2,734,675
CARTON FOR MAKING ICE CREAM SANDWICHES
Filed Oct. 28, 1952
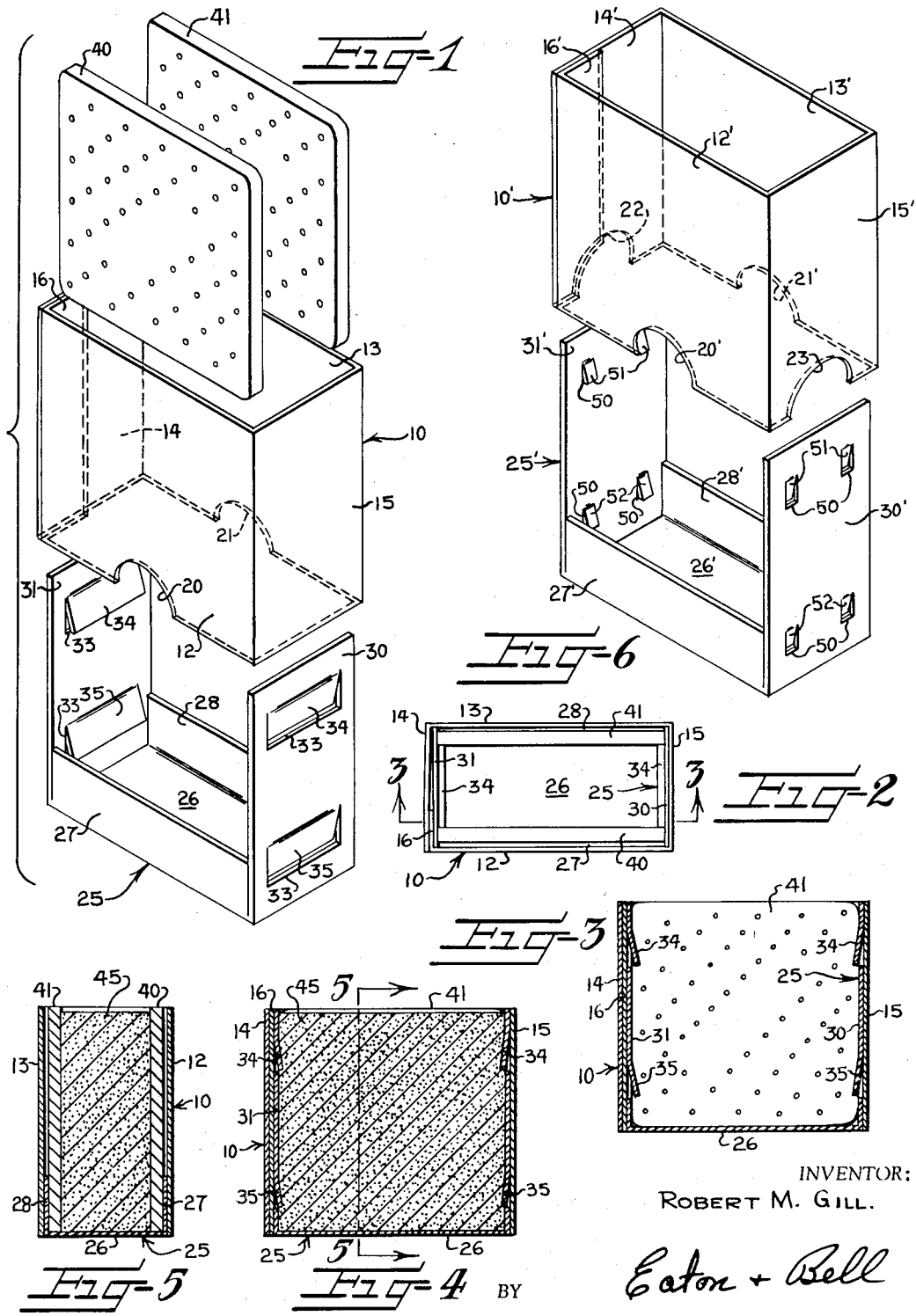
INVENTOR:
ROBERT M. GILL.
BY Eaton + Bell
ATTORNEYS

United States Patent Office 2,734,675
Patented Feb. 14, 1956

2,734,675

CARTON FOR MAKING ICE CREAM SANDWICHES

Robert M. Gill, Charlotte, N. C.

Application October 28, 1952, Serial No. 317,200

3 Claims. (Cl. 229—6)

This invention relates to a carton and more especially to a carton designed for the purpose of holding a pair of wafers of edible material in spaced relation to each other in order to insert an ice cream filling or the like therebetween.

Heretofore it has been common practice to freeze the ice cream filling or the like and place the wafers or edible cake or crackers on either side thereof to form a sandwich, after which the sandwich is placed in a bag or container to be distributed. Often the sandwiches, thus packaged, after shipping and handling a few times became broken or distorted from their regular rectangular shape making the sandwiches unattractive in appearance and hard to handle when being eaten.

It is therefore an object of this invention to provide a carton consisting of a substantially rectangularly shaped sleeve portion open at both its ends and having a substantially U-shaped insert member which has a base sufficiently large in area to close the lower end of the rectangularly shaped sleeve at one end thereof and which has a pair of upstanding members of substantially the same height as the side-walls of the rectangular sleeve, said upstanding members being provided with inwardly extending projections to accurately space the two wafers and to hold the same apart in spaced relation to each other while the fluid ice cream is placed therebetween.

The base of said U-shaped insert member has a pair of upstanding side members extending upwardly therefrom and which are disposed inside the confines of the rectangular sleeve.

This invention is an improvement over the types of cartons shown in the patents to Overland, No. 2,521,403 and Henderson, No. 2,591,812. In the cartons disclosed in said patents the sandwich is ejected from the sleeve and held in the hand of the person desiring to eat the same. Generally, as the sandwich is being eaten, the ice cream will begin to melt and drip onto the hand of the person eating the same. It is a primary object of this invention to overcome this difficulty by providing a carton with an insert which may be grasped and pulled from the bottom of the sleeve and then used to hold the sandwich while eating the same.

In said prior cartons, the U-shaped insert member is scored and folded which usually requires an additional step in the manufacture of the same and further upon the ice cream being frozen, the ridges and the like formed by the folds cause like ridges in the ice cream which disfigure the same. It is, therefore, another object of this invention to provide a U-shaped sleeve insert having partial cut outs therein which are folded outwardly to form projections for holding the wafers in spaced relation to each other to permit ice cream to be poured therebetween and whereby, upon the ice cream being solidified, the projections will be pushed back into alinement with the walls of the insert so as not to leave marks on the frozen ice cream.

Some of the objects of the invention having been stated other objects will appear as the description proceeds, when taken in connection with the accompanying drawings, in which—

Figure 1 is an exploded view of the improved carton showing the rectangular sleeve member in the center, the U-shaped insert member at the bottom and two wafers used in making a sandwich at the top;

Figure 2 is a top plan view of the assembled carton with the two wafers disposed therein in spaced relation to each other;

Figure 3 is a vertical sectional view taken substantially along the line 3—3 in Figure 2;

Figure 4 is a vertical sectional view similar to Figure 3 but showing the carton with semi-liquid filling or ice cream therein;

Figure 5 is a vertical sectional view taken substantially along the line 5—5 in Figure 4 and showing the improved carton with ice cream therein;

Figure 6 is a view similar to Figure 1, with the wafers being omitted, and showing a modified form of the rectangular sleeve and insert members.

Referring more specifically to the drawings, there will be observed a rectangularly shaped sleeve member broadly designated at 10 which is formed from a single piece of paper stock and folded along suitable score lines to form front and rear walls 12 and 13, respectively, and ends walls 14 and 15, and having one end thereof overlapping the other as at 16, this overlap being suitably secured together in any suitable manner such as by adhesive. The side walls 12 and 13 of the rectangular sleeve 10 have near their lower edges a pair of semi-circular cut-outs 20 and 21 the purpose of which will be later described.

A substantially U-shaped insert member broadly designated at 25 is provided to be at times inserted in the rectangularly shaped sleeve 10 and comprises a base 26 which is large enough in area and of the same configuration as the lower open end of the rectangular shaped sleeve member 10 and which will close the same as the insert 25 is inserted into the rectangularly shaped sleeve member 10. The base 26 has, at each side thereof, upwardly bent flaps 27 and 28 and has at opposed ends thereof a pair of upstanding members 30 and 31 which are slightly narrower than the width of the end walls 15 and 16 of the rectangularly shaped sleeve member 10 to permit easy insertion thereof.

In the preferred form of this invention, the upstanding members 30 and 31 have been cut along three sides of a rectangle as at 33 and the stock enclosed thereby has been pushed inwardly to form upper and lower inwardly projecting tabs 34 and 35, respectively, in each of the upstanding members 30 and 31.

The tabs 34 and 35 thus formed, when the insert 25 is inserted into the rectangularly shaped sleeve 10, provide a means for placing a pair of edible wafers 40 and 41 between the outer edges of said tabs 34 and 35 and the side walls 12 and 13 of the rectangularly shaped sleeve 10 and insure that the wafers 40 and 41 remain in a spaced relation to each other.

It is thus seen that as the carton comprising the sleeve 10 and the insert 25 are put together and the wafers 40 and 41 placed therein there is an open space provided between the members 30 and 31 of the insert 25 and the lower end thereof is closed by the base 26 of the insert 25. An ice cream mix or other suitable fillings 45 may then be poured in a semi-frozen condition into the space between the wafers 40 and 41 in the carton and then, the carton, along with the ice cream mix may be subjected to a low enough temperature to freeze the ice cream mix or other filling into a solid state. As the ice cream mix solidifies the projections 34 and 35 will be pushed back flush with the side walls 30 and 31 of the insert so as not to disfigure the sandwich thus formed.

It is thus seen that I have provided a carton for making ice cream sandwiches which will facilitate the fast packaging of these sandwiches and which will provide a support to prevent damaging and compressing of the sandwiches and which will at the same time facilitate easy consumption of the ice cream sandwiches by the consumer. The notches and cut-outs 20 and 21 in the side walls 12 and 13 of the rectangularly shaped sleeve are provided so that the consumer may grasp the upwardly extending tabs 27 and 28 of the insert 25 with his fingers to pull the insert and sandwich from the sleeve to permit the insert 25 to be used as a holder for the sandwich while it is being eaten so that the consumer's fingers do not come in contact with the wafers or ice cream filling to thereby prevent the ice cream or the wafers from getting on the consumer's hands.

Referring to Figure 6 there will be observed a slightly modified form of carton which is similar to the first form of the invention and wherein like parts will bear like reference characters with the prime notation added. By referring to the rectangularly shaped sleeve member 10' in Figure 6 it will be noted that the end walls 14' and 15' have a pair of semi-circular openings 22 and 23 therein which are similar to the openings 20' and 21' in the side walls 12' and 13', respectively. It is thus seen that with the additional semi-circular openings 22 and 23 in the rectangularly shaped sleeve 10' the insert 25' may easily be grasped by the consumer at the sides, as in the first form of the invention, or may be grasped at either end.

The insert member 25' is substantially the same as the insert member 25 except that the upstanding members 30' and 31' are provided with a plurality of substantially shorter rectangularly shaped cut lines 50 which define upper and lower inwardly projecting tabs 51 and 52, respectively, which are provided to hold the wafers of edible cake or crackers 40 and 41 apart from each other and in spaced relation to each other.

It is thus seen that as the insert member 25' is placed in the rectangularly shaped sleeve 10' the wafers 40 and 41 may then be placed in position between the upper tabs 51 and lower tabs 52 and the side walls 12' and 13' to thereby be held in spaced relation to each other as a semi-frozen mixture of ice cream or the like is poured into the opening between said spaced wafers or crackers 40 and 41, after which the carton along with the semi-frozen ice cream, or the like, and the wafers 40 and 41 is then subjected to a low enough temperature to freeze the soft ice cream solid, thereby, forming an ice cream sandwich with the carton therearound. This carton provides a sandwich which is closed on five sides and which cannot easily be damaged or compressed out of position or so that the ice cream and wafers thereon cannot easily be separated.

In the drawings and specification there has been set forth a preferred embodiment of the invention and, although specific terms are employed, they are used in a generic and descriptive sense only and not for purposes of limitation, the scope of the invention being defined in the claims.

I claim:

1. A carton for ice cream sandwiches formed from two edible wafers and an ice cream filling, said carton comprising a rectangular sleeve having front and rear walls and a pair of end walls, a substantially U-shaped insert member fitted within said sleeve and comprising a rectangular base of the same size as the interior of said rectangular sleeve, a pair of upstanding side flaps extending from said rectangular base and a pair of upstanding members extending upwardly from opposed ends of said base, said upstanding members each having upper and lower inwardly projecting hinged tabs partially cut therefrom, said tabs extending inwardly within said carton at an angle less than ninety degrees, and said tabs being spaced from the edges of said upstanding members and serving to hold a pair of wafers in spaced relation to each other to permit filling to be placed therebetween to form a sandwich.

2. A carton for ice cream sandwiches and the like, comprising a rectangular sleeve and a substantially U-shaped insert member fitted within said sleeve, said insert member comprising a rectangular base of the same size as the interior of the sleeve and a pair of upstanding members extending from opposed ends of said base and said upstanding members each being of a width equal to the width of said base, vertically spaced articulated tabs cut from each of said upstanding members and extending inwardly within said carton at an angle less than ninety degrees, and said tabs being spaced from the edges of said upstanding member.

3. In a carton adapted to contain a sandwich formed from a pair of edible wafers and an ice cream filling, said carton comprising a rectangular sleeve and a substantially U-shaped insert member having a rectangular base of the same size as the interior of said rectangular sleeve and a pair of upstanding members hingedly connected to opposed ends of said base, the combination of means for maintaining the wafers in spaced relation to each other during the formation of the sandwich comprising vertically alined inwardly projecting hinged tabs extending from each of said upstanding members at an angle less than ninety degrees and spaced from the vertical edges thereof a distance approximately equal to but not less than the width of said wafers, said tabs also being spaced from the horizontal edges of said upstanding members, the width of said upstanding members being at least equal to the width of said base, and said insert member being mounted within said rectangular sleeve to secure said wafers between said sleeve and opposite ends of said tabs.

References Cited in the file of this patent

UNITED STATES PATENTS

| | | |
|---|---|---|
| 401,774 | Chase | Apr. 23, 1889 |
| 1,668,234 | Fancher | May 1, 1928 |
| 1,755,699 | Loehr | Apr. 22, 1930 |
| 2,210,251 | Murphy | Aug. 6, 1940 |
| 2,591,812 | Henderson | Apr. 8, 1952 |